US 6,710,319 B2

(12) United States Patent
Ohtomo et al.

(10) Patent No.: US 6,710,319 B2
(45) Date of Patent: Mar. 23, 2004

(54) SYSTEM FOR RADIATING A REFERENCE LASER BEAM AND UTILIZING GPS UNITS FOR INSTALLING AN ARTICLE

(75) Inventors: Fumio Ohtomo, Tokyo (JP); Satoshi Hirano, Pleasanton, CA (US); Ray O'Connor, Pleasanton, CA (US); Kunihiro Hayashi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/802,067

(22) Filed: Mar. 8, 2001

(65) Prior Publication Data

US 2002/0125407 A1 Sep. 12, 2002

(51) Int. Cl.[7] .............................................. G01C 21/24
(52) U.S. Cl. ........................ 250/206.1; 33/285; 356/138
(58) Field of Search ........................... 250/206.1, 206.2; 33/285, 286, 290; 356/138, 247, 248, 399, 400

(56) References Cited

U.S. PATENT DOCUMENTS 5,600,436 A * 2/1997 Gudat ..................... 356/141.3
6,175,328 B1  1/2001 Ericsson et al.

FOREIGN PATENT DOCUMENTS

EP   0 481 307 A2   4/1992  ............. G01S/5/14
JP   11-256620 A  * 9/1999

WO   WO 00/07034   2/2000  ............. G01S/1/70

* cited by examiner

Primary Examiner—Thanh X Luu
(74) Attorney, Agent, or Firm—Chapman and Cutler LLP

(57) ABSTRACT

A novel system for facilitating the work for setting the horizontal direction of a guide laser beam is disclosed. The guide laser beam (P) can be radiated in vertical and lateral directions from the horizontal direction as a reference by a guide laser beam radiator (20). The reference horizontal direction position of the guide laser beam radiator (20) is detected by a first GPS unit (75). A pole (81) has a second GPS unit (76) for detecting a horizontal position. A reference horizontal direction position of the guide laser radiator (20) is detected by the first GPS unit (75). A first horizontal direction position is detected by the second GPS unit (76) of the pole (81) set up at a first position (83), thereby specifying the direction Z1 in which the guide laser beam (P) is to be radiated from the reference horizontal direction position as an origin. A second horizontal direction position is detected by the second GPS unit (76) of the pole (81) set up at a second position (80) so as to radiate the guide laser beam (P) on the pole (81), thus specifying the actual direction in which the guide laser beam (P) is radiated from the reference horizontal direction position as an origin. The angle ($\phi$) that the direction in which the guide laser beam (P) is to be radiated forms to the actual direction (Z2) in which the guide laser beam (P) is radiated is determined. Based on the angle $\phi$, the direction Z2 in which the guide laser beam (P) is actually radiated is changed to the direction Z1 in which the guide laser beam (P) is to be radiated.

3 Claims, 10 Drawing Sheets

FIG. 13

SYSTEM FOR RADIATING A REFERENCE LASER BEAM AND UTILIZING GPS UNITS FOR INSTALLING AN ARTICLE

BACKGROUND OF THE INVENTION

1. Field of the Invention

The present invention relates to an improvement in a guide laser beam direction setting method for executing the construction work using a guide laser beam accompanied by a measurement work.

2. Description of the Related Art

Figure 13:
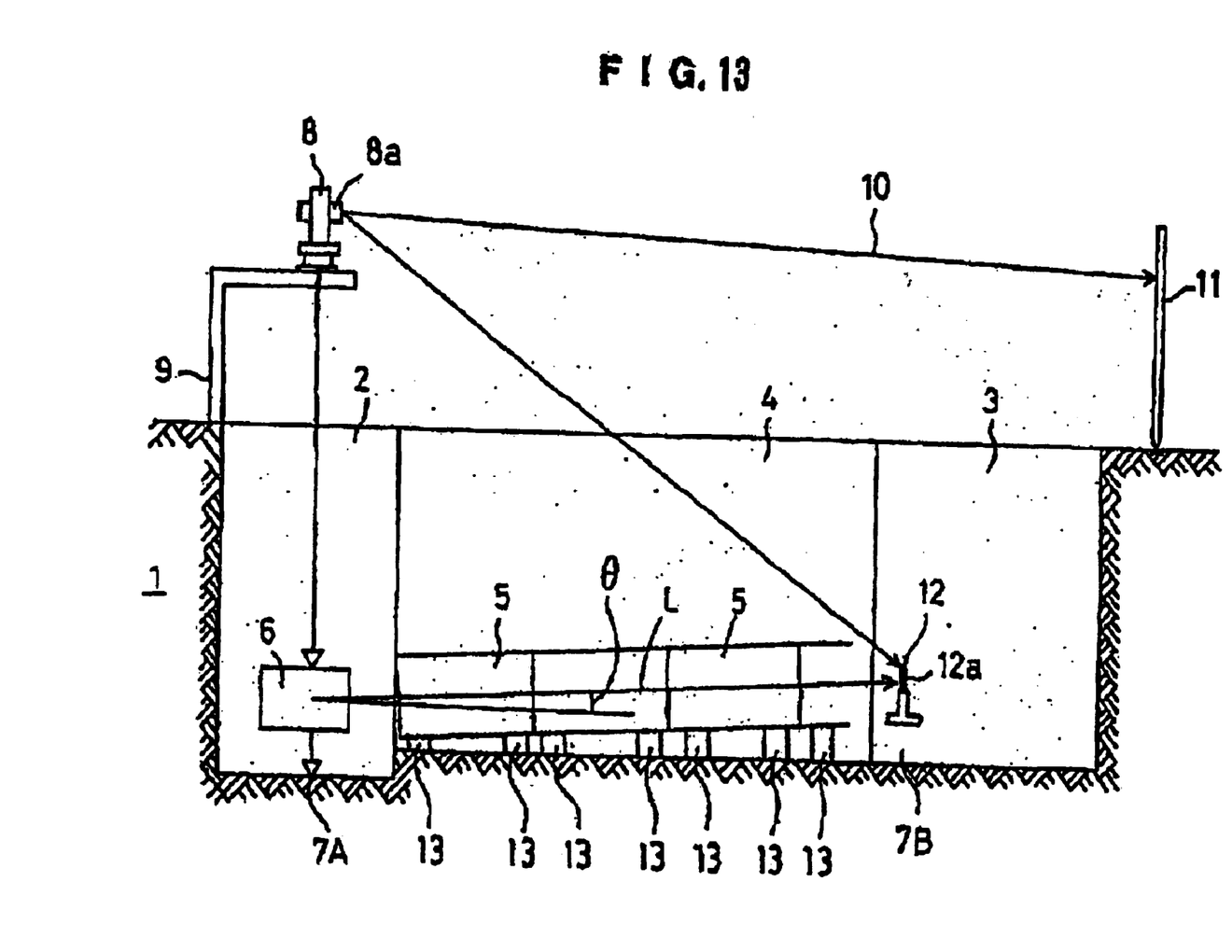
FIG. 13 is a diagram showing an example of the conventional guide laser beam direction setting work system.

The work of laying a pipe (Hume pipe) shown in FIG. 13 is a known example of the conventional construction work accompanied by a measurement work. In FIG. 13, reference numeral 1 designates the ground, numerals 2, 3 pits and numeral 4 a groove for communication between the pits 2 and 3. Pipes 5 are laid in the groove 4.

A manhole not shown is installed in each of the pits 2, 3 after laying the pipe 5. The pipe 5 is used as a path of liquids and liquefied objects including tap water and sewage. The pipe 5 is laid in the grooves 4 at a predetermined gradient θ. The pipe 5 is required to be laid straight. If the pipe 5 is laid in zigzag in any of the lateral and vertical directions, the liquefied objects may clog the pipe 5 or leak out into the ground. In the work of laying the pipe 5, therefore, a reference line is required. For defining a reference line of this kind, a guide laser beam has often been used in recent years. The process of the work for laying the pipe using the guide laser beam will be explained below.

The positions where the manholes are to be installed and the distance between and the direction of the manholes are determined by the measurement based on the working drawing and known points. According to this measurement, the pits 2, 3 and the groove 4 are dug and reference points 7A, 7B are set.

In the pit 2, the center of rotation of a guide laser beam radiator 6 is set on a reference point 7A. The center of rotation is coincident with the origin of the laser beam. A theodolite 8 is installed on a support 9 just above the center of rotation of the guide laser beam radiator 6. A pole 11 based on the measurement is set up on an extension line 10 of the line connecting the manhole reference point 7A of the pit 2 and the manhole reference point 7B of the pit 3.

First, the worker observes the pole 11 by turning a telescope 8a of the theodolite 8 in horizontal plane. In the vertical plane containing the pole 11, the telescope 8a is turned at angles of elevation thereby to observe the point where a target 12 is to be placed. The angle of the telescope 8a in elevation is known in advance based on the working plan.

As the next step, the worker installs the target 12 at the reference point 7B of the pit 3 in such a manner that the center of the target 12 coincides with the sight line of the telescope 8a. The target 12 has a diffusion plate 12a. The worker can observe the guide laser beam radiated on the target 12 from the guide laser beam radiator 6 side.

Then, the worker turns the guide laser beam horizontally by operating the guide laser beam radiator 6 so that the center of the guide laser beam comes to coincide with the center of the target 12. In order to incline the guide laser beam at the gradient angle of the pipe 5, the gradient angle is input in the guide laser beam radiator 6. The guide laser beam is turned in the vertical plane by operating the guide laser beam radiator 6. By doing so, the work of setting the guide laser beam in horizontal and vertical directions is completed and a reference line L is set by the guide laser beam.

In order to locate the center of the pipe 5 at the center of the reference line L, the pipe 5 is laid on a trestle 13 and the manholes are connected by the pipe 5. The pipe 5 is buried after being laid this way.

In the conventional construction work, the pole 11 is required to be observed using the theodolite 8 to set the horizontal direction position of the guide laser beam. This poses the problem that a large measurement error may be caused in the case where the theodolite 8 is operated by an unskilled worker.

Especially in executing the work for installing the pipe 5 connecting the manholes, the measurement work is required to be conducted by installing the theodolite on a manhole providing a poor foothold. Therefore, the problem is that the operation of the theodolite requires a considerable skill and consumes a considerable length of time for setting the horizontal direction position of the guide laser beam.

SUMMARY OF THE INVENTION

The present invention has been developed in view of the aforementioned situation, and the object thereof is to provide a guide laser beam direction setting work system capable of facilitating the work for setting the horizontal direction position of the guide laser beam.

According to a first aspect of the invention, there is provided a guide laser beam direction setting work system comprising a guide laser beam radiator capable of radiating a guide laser beam in vertical and lateral directions based on the horizontal direction, a first GPS unit for detecting a reference horizontal direction position of the guide laser beam radiator, and a second GPS unit far detecting a position in horizontal direction: wherein a reference position in horizontal direction of the guide laser beam radiator is detected using the first GPS unit while at the same time detecting a first position in horizontal direction using the second GPS unit located at a first position thereby to specify the direction in which the guide laser beam is to be radiated from the reference position in horizontal direction as an origin; a second position in horizontal direction is detected using the second GPS unit located at a second position in the actual direction of radiation of the guide laser beam thereby to specify the actual direction of radiation of the guide laser beam from the reference position in horizontal direction as an origin, whereby the angle that the direction in which the guide laser beam is to be radiated forms to the actual direction of radiation of the guide laser beam is determined, and the actual radiation direction of the guide laser beam is set in the direction in which the guide laser beam is to be radiated, based on the angle thus determined.

According to a second aspect of the invention, there is provided a guide laser beam direction setting work system comprising a guide laser beam radiator capable of radiating a guide laser beam in vertical and lateral directions based on the horizontal direction, a first GPS unit for detecting a reference position in horizontal direction of the guide laser beam radiator, a pole including a second GPS unit for detecting a horizontal position: wherein a reference position in horizontal direction of the guide laser beam radiator is detected the first GPS unit while at the same time detecting a first position in horizontal direction using the second GPS unit of the pole located at a first position thereby to specify the direction in which the guide laser beam is to be radiated from the reference horizontal direction position as an origin;

a second position in horizontal direction is detected using the second GPS unit of the pole set to be radiated at a second position in such a manner as to be radiated by the guide laser beam thereby to specify the actual direction of radiation of the guide laser beam from the reference position in horizontal direction as an origin; the angle that the direction in which the guide laser beam is to be radiated forms to the actual direction of radiation of the guide laser beam is determined; and the actual radiation direction of the guide laser beam is set in the direction in which the guide laser beam is to be radiated, based on the angle thus determined.

According to a third aspect of the invention, there is provided a guide laser beam direction setting work system, wherein the pole for detecting the first position in horizontal direction is the same as the pole for detecting the second position in horizontal direction.

According to a fourth aspect of the invention, there is provided a guide laser beam direction setting work system: wherein the GPS units are each connected to a radio communication unit for transmitting the position data in horizontal direction; the guide laser beam radiator includes a receiver for receiving the position data and arithmetic means for calculating, based on the position data, the direction in which the guide laser beam is actually radiated, the direction in which the guide laser beam is to be radiated and the angle that the direction in which the guide laser beam is actually radiated forms to the direction in which the guide laser beam is to be radiated; and the actual radiation direction of the guide laser beam is set in the direction in which the guide laser beam is to be radiated, based on the result of the calculation by the arithmetic means.

According to a fifth aspect of the invention, there is provided a guide laser beam direction setting work system comprising: a guide laser beam radiator capable of radiating a guide laser beam in vertical and lateral directions based on the horizontal direction and capable of setting the direction of radiation of the guide laser beam to the center of a target by receiving the light reflected from the target; a first GPS unit for detecting a reference position in horizontal direction of the guide laser beam radiator; and a pole including a second GPS unit for detecting a horizontal position and a pole integrated with the target; wherein a reference position in horizontal direction of the guide laser beam radiator is detected using the first GPS unit while at the same time detecting a first position in horizontal direction using the second GPS unit of the pole located at a first position thereby to specify the direction in which the guide laser beam is to be radiated from the reference position in horizontal direction as an origin, and by set, using the second GPS unit, the pole at a second position on a line in the direction between and connecting the first position and the reference position in horizontal direction and g the guide laser beam in horizontal direction in such a manner as to be radiated by the guide laser beam at the center of the tot, the actual radiation direction of the guide laser beam is set in the ion in which the guide laser beam is to be radiated.

According to a sixth aspect of the invention, there is provided a guide laser beam direction setting work system, wherein the guide laser beam is operated to scan under the control of an optical remote control unit.

BRIEF DESCRIPTION OF THE DRAWINGS

FIG. 2 is a diagram showing the relation between the target shown in FIG. 1 and pulses based on the laser beam reflected from the target, in which (a) is a plan view of the target and (b) shows an example of the pulses produced from the reflected laser beam.

FIG. 9 is a diagram for explaining the guide laser beam direction setting work system according to a first embodiment of the invention, in which (a) is a plan view and (b) is a sectional view.

DESCRIPTION OF THE PREFERRED EMBODIMENTS

First, an explanation will be given of a configuration and a target of a guide laser beam radiator used for the guide laser beam direction setting method according to the invention.

[Configuration of Guide Laser Beam Radiator and Target]

Figure 1:
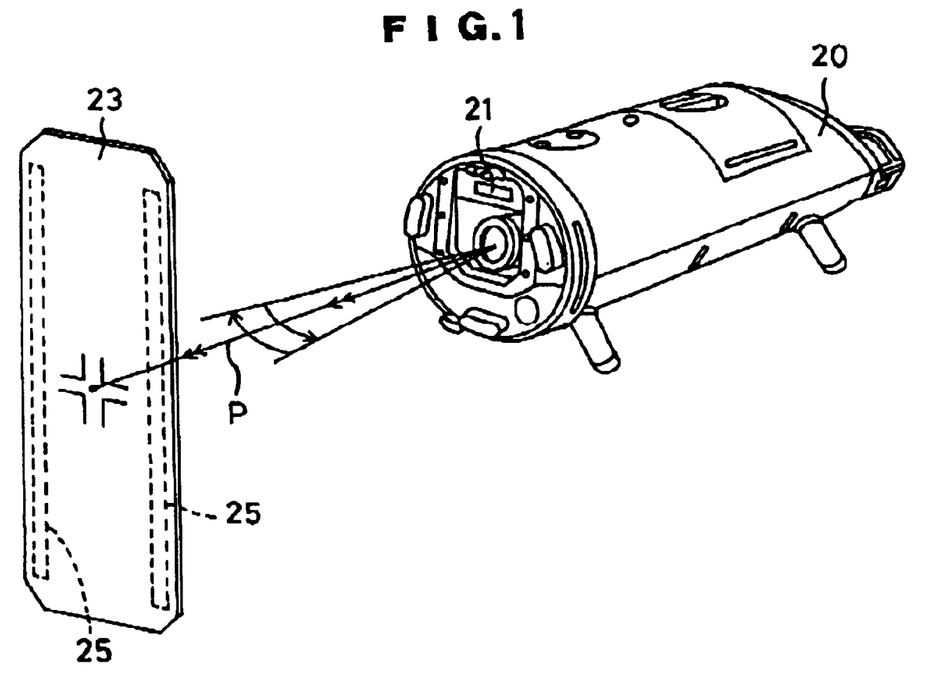
FIG. 1 is a diagram showing the external appearance of a guide laser beam radiator used for a guide laser beam direction setting work system according to the present invention.

FIG. 1 is an external view of a guide laser beam radiator 20 according to the invention. The guide laser beam radiator 20 emits a guide laser beam P. The guide laser beam radiator 20 includes a light receiving window 21 on the front part thereof. The light receiving window 21 is shared by an optical remote control light receiving unit and a reflected guide laser beam receiving unit.

Figure 2A:
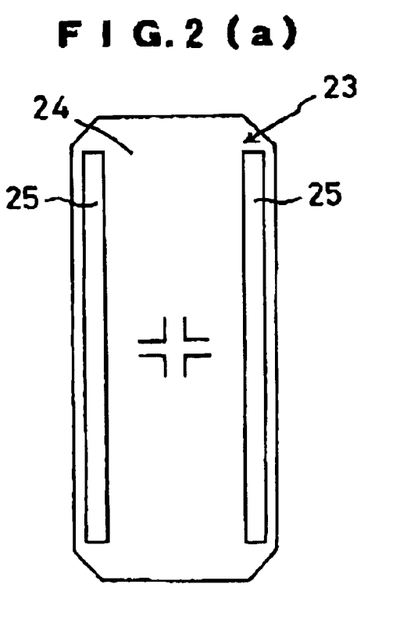

Reference numeral 23 designates a target. The target 23 includes a diffusion surface 24 and a pair of retroreflection surfaces 25, as shown in FIG. 2(a). The diffusion surface 24 diffuses the guide laser beam so that the worker can observe the guide laser beam P impinging on the diffusion surface 24. The retroreflection surfaces 25 are arranged in predetermined spaced relation with each other.

The retroreflection surface pair 25 reflects the guide laser beam P in the original direction. The reflected laser beam is received by a photoelectric conversion element described later through the light receiving window 21.

Figure 3:
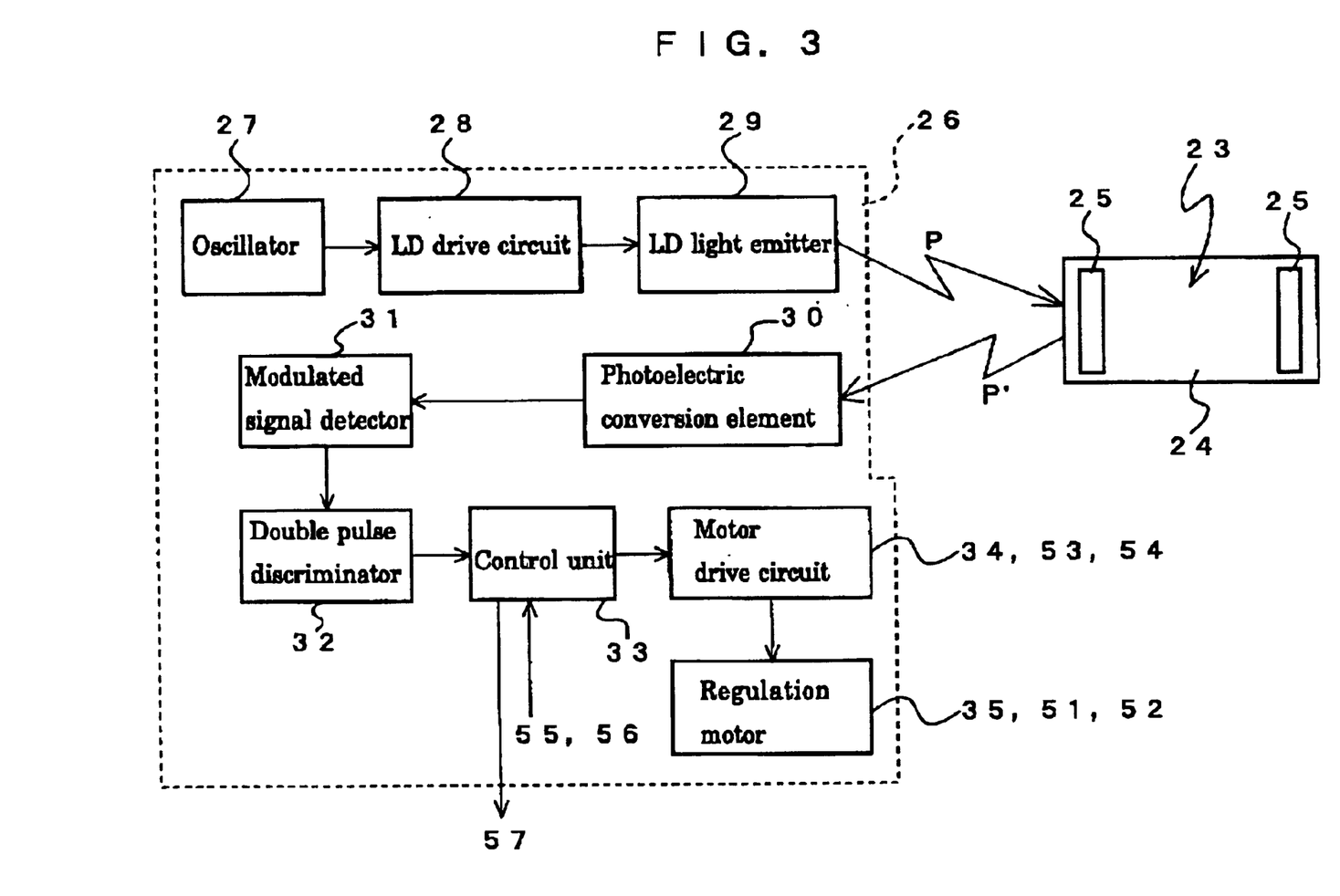
FIG. 3 is a block diagram showing a reflected light detection circuit of the guide laser beam radiator shown in FIG. 1.

The guide laser beam radiator 20 includes a reflected light detection circuit unit 26 shown in FIG. 3. The reflected light detection circuit unit 26 includes an oscillator 27, a LD drive unit 28, a LD light emitter 29, a photoelectric conversion element 30 constituting a reflected guide laser beam receiving unit, a modulated signal detector 31, a double pulse discriminator 32, a control unit 33, a motor drive circuit 34 and a horizontal angle regulation motor 35.

The LD drive unit 28 drives by modulation the LD light emitter 29 based on the oscillation signal of the oscillator 27. As a result, the guide laser beam P is radiated toward the target 23. When the guide laser beam P is reflected from the retroreflection surface 25, the reflected laser beam P' proceeds in the original direction and is received by the photoelectric conversion element 30.

Figure 2B:
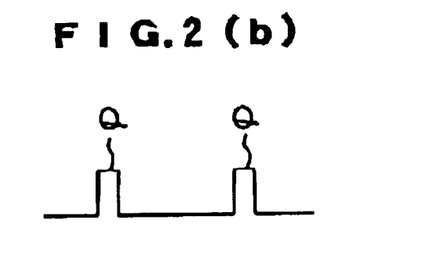

The modulated signal detector 31 functions to discriminator the external light and the reflected laser beam P', and detects the pulses Q (FIG. 2(b)) corresponding to the reflected laser beam P'. The double pulse discriminator 32 determines whether the pulses Q output from the modulated signal detector 31 are double pulses or not.

Upon detection of double pulses by the double pulse discriminator 32, the control unit 33 drives the motor drive circuit 34, so that the horizontal angle regulation motor 35 is driven in the opposite direction thereby to direct the guide laser beam P toward the center of the target 23.

Figure 4:
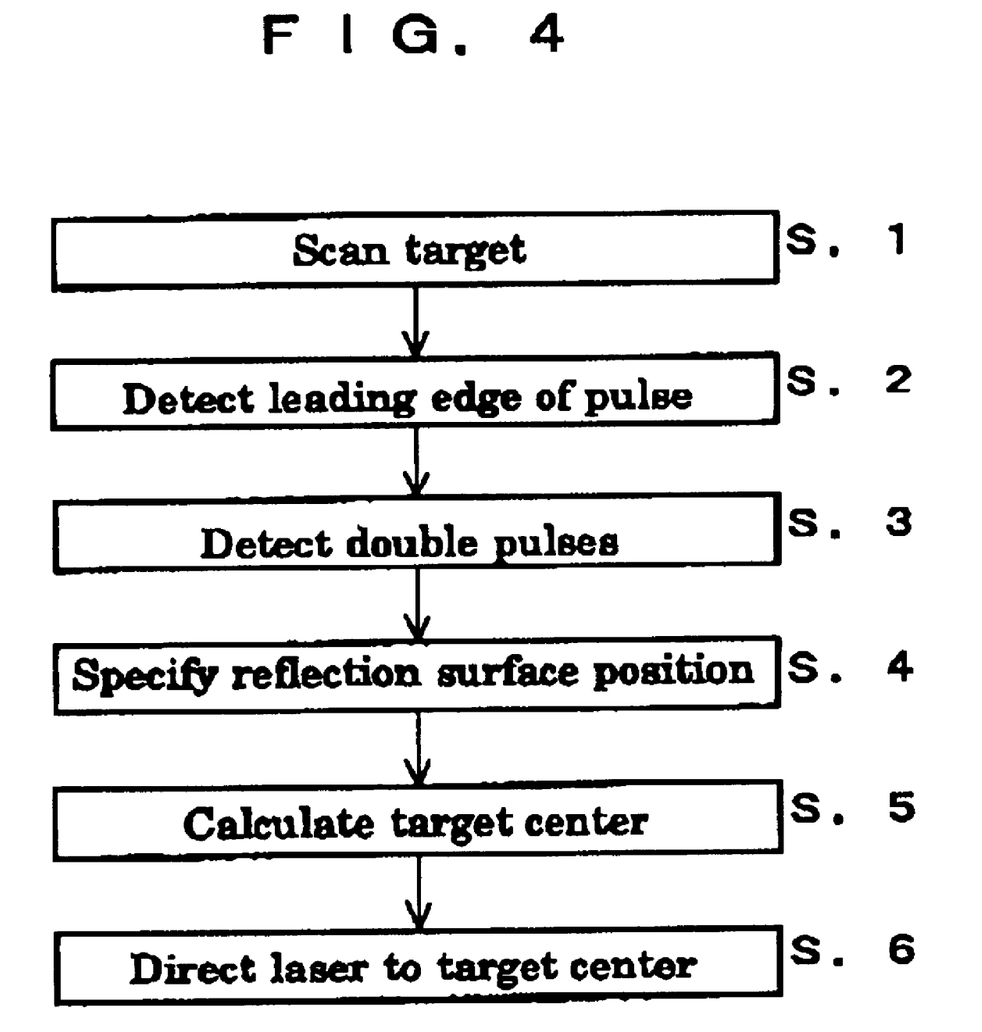
FIG. 4 is a flowchart for explaining the scanning of the guide laser beam using the reflected light detection circuit shown in FIG. 3.
Figure 5:
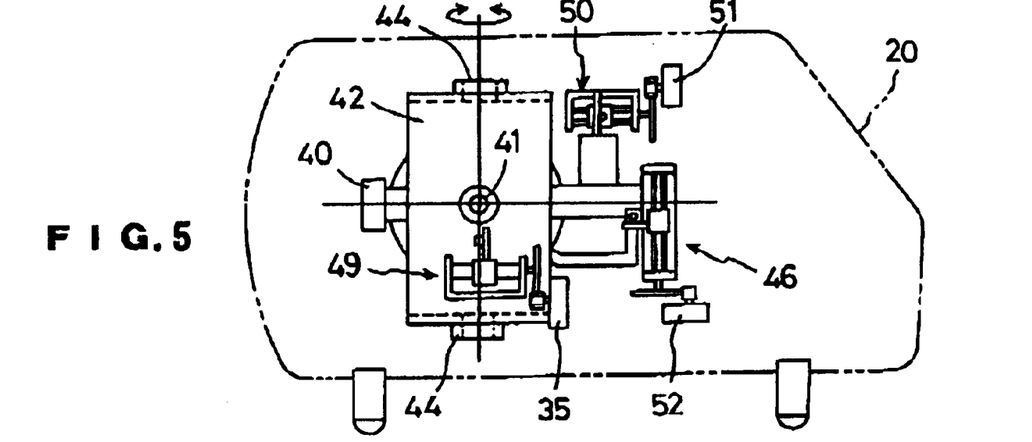
FIG. 5 is a side view showing the internal structure of the guide laser beam radiator shown in FIG. 1.

Specifically, as shown in the flowchart of FIG. 4, the guide laser beam radiator 20 is driven to start the scanning of the target 23 (S.1), the horizontal angle regulation motor 35 is routed in a predetermined direction, the leading edge of the pulse Q based on the reflected laser beam P' (S.2) is detected, the double pulse discriminator 32 determines whether the pulses Q are double pulses or not (S.3), thereby specifying the interval between the retroreflection surfaces 25 (S.4), and the control unit 33 calculates the central position of the target 23 (S.5). As a result, the control unit 33 inversely drives the horizontal angle regulation motor 35 in such a manner that the guide laser beam P is directed to the central position of the target 23 (S.6).

The central position of the target 23 can be searched for by use of an optical remote control unit. The operation of searching fit the central position by the optical remote control unit will be explained later.

A laser beam oscillator 40 is arranged in the guide laser beam radiator 20 as shown in FIGS. 5 to 8. The lase beam oscillator 40 is mounted on a swing frame 42 tiltable about a horizontal shaft 41. The swing frame 42 is supported on a main frame 43 through a vertical shaft 44. The swing frame is rotatable in a horizontal plane about the vertical shaft 44.

A tilt frame 45 is arranged on the horizontal shaft 41. A tilt mechanism 46 is coupled to the tilt frame 45. The tilt mechanism 46 includes a tilt sensor (designated by numeral 55 in FIG. 8) indicating the horizontality. The tilt mechanism 46 is integrated with a support member of the laser beam oscillator 40 and tiltable integrally with the laser beam oscillator 40.

An encoder 47 for detecting the tilt angle of the laser beam oscillator 40 is mounted on the horizontal shaft 41. The rotation angle detection signal of the encoder 47 is input to the motor drive unit 54 shown in FIG. 8.

A horizontal angle regulation mechanism 49 is coupled to the swing frame 42. A vertical angle regulation mechanism 50 is coupled to the laser beam oscillator 40. The horizontal angle regulation mechanism 49 is driven by the horizontal angle regulation motor 35. As a result, the laser beam oscillator 40 is rotated horizontally, and the guide laser beam P is scanned horizontally.

The vertical angle regulation mechanism 50 is driven by the vertical angle regulation motor 51. As a result, the laser beam oscillator 40 is rotated in a vertical plane. The tilt mechanism 46 is tilted in vertical direction together with the laser beam oscillator 40 by the vertical angle regulation mechanism 50. This tilt mechanism 46 is driven by a gradient setting motor 52 thereby to set the gradient of the guide laser beam P in vertical direction. The vertical angle regulation motor 51 is driven by a motor drive circuit 53 shown in FIG. 8, and the gradient setting motor 52 is driven by a motor drive unit 54.

Figure 8:
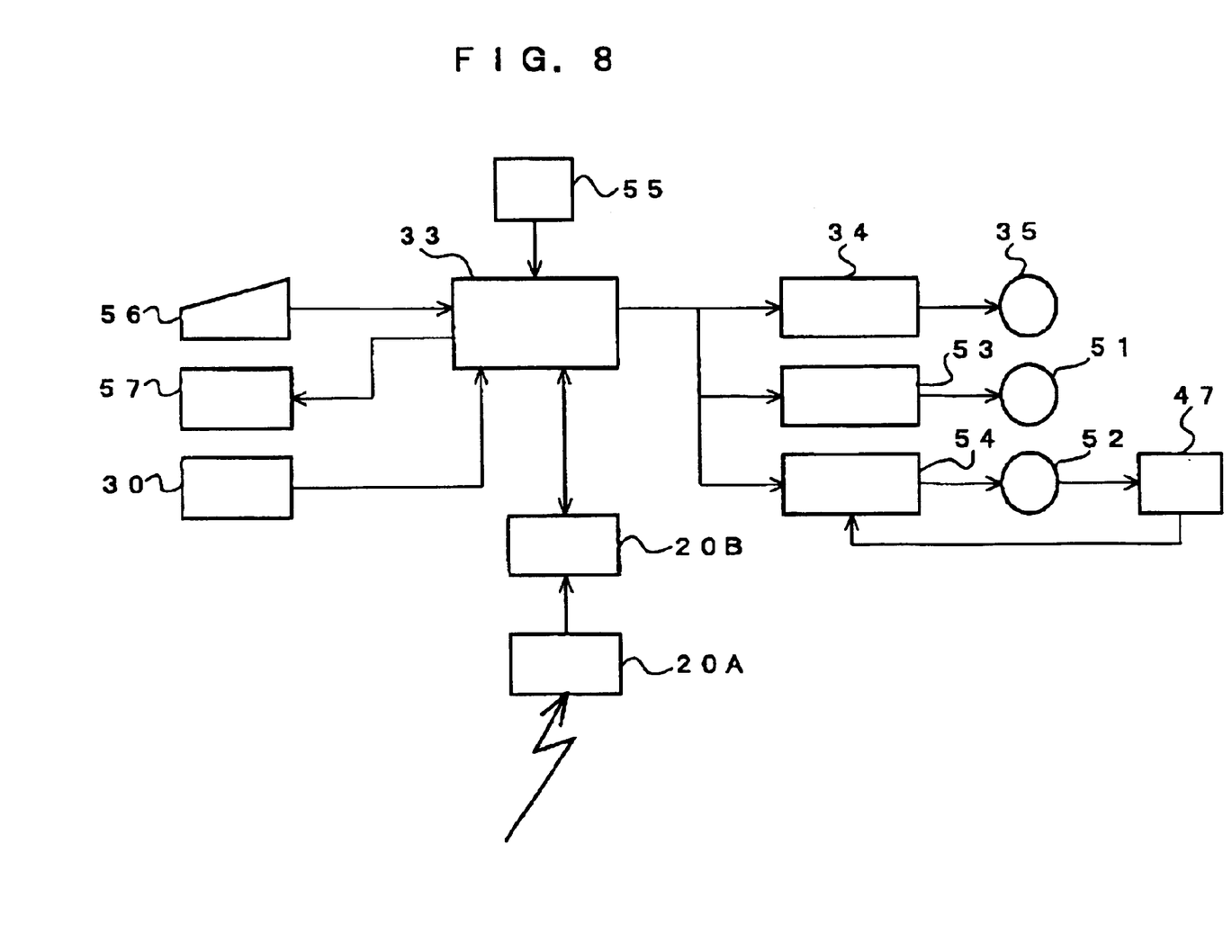
FIG. 8 is a block diagram for explaining a drive circuit for the guide laser beam radiator shown in FIG. 1.

As shown in FIGS. 1, 3, and 8, the motor drive units 53, 54 and the motor drive unit 34 are all controlled by a control unit 33. The control unit 33 is supplied with the detection signal from the tilt sensor 55. The control unit 45 is connected to an operation panel 56 for turning on and off the guide laser beam radiator 20 and setting the gradient of the guide laser beam, a display unit 57 for displaying the gradient setting, and the photoelectric conversion element 30.

Figure 6:
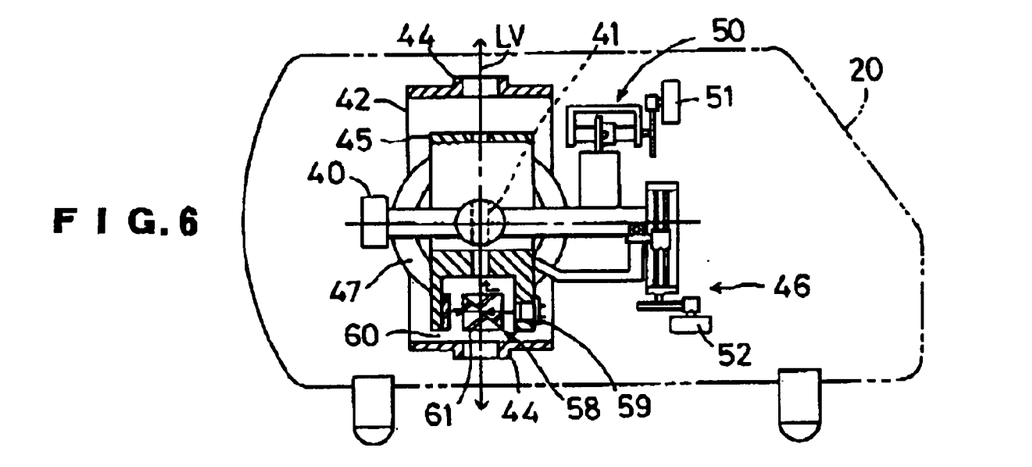
FIG. 6 is a longitudinal sectional view of the internal structure of the guide laser beam radiator shown in FIG. 1.
Figure 7:
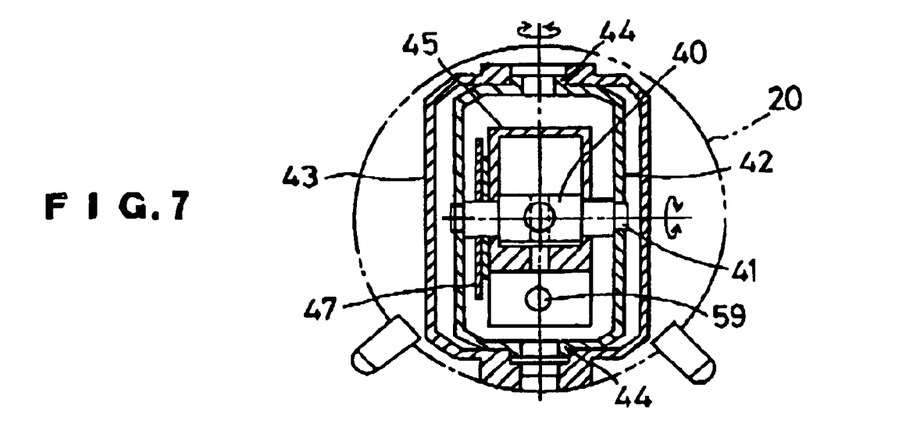
FIG. 7 is a front sectional view of the internal structure of the guide laser beam radiator shown in FIG. 1.

A forked portion is arranged at the lower end of the tilt frame 45 as shown in FIG. 6. The forked portion has a vertical beam emitter 58. A laser beam emitter 59 is arranged on one of the legs of the forked portion, and a reflector 60 is arranged on the other leg thereof. A beam splitter 61 is interposed between the laser beam emitter 59 and the reflector 60. The beam splitter 61 splits the laser beam emitted from the laser beam emitter 59, into two directions, upward and downward. The laser beam is thus reflected vertically upward and vertically downward, and used as centripetal means. In FIG. 6, reference characters LV designate the laser beam directed vertically upward.

In this way, the guide laser beam radiator 20 is capable of radiating the guide laser beam P in four directions based on the horizontal direction. For a detailed configuration of the guide laser beam radiator 20, refer to, for example, Japanese Unexamined Patent Publication No. 9-257477.

The guide laser beam radiator 20 includes a radio receiver 20A and arithmetic means 20B as shown in FIG. 8. The radio receiver 20A is connected to the arithmetic means 20B. The functions of the radio receiver 20A and the arithmetic means 20B will be described later.

[Guide Laser Beam Direction Setting Method According to First Embodiment]

Now, the work for setting the direction in which the guide laser beam P is radiated by use of the guide laser beam radiator 20 according to a first embodiment will be explained with reference to FIGS. 8 and 9.

Figure 9A:
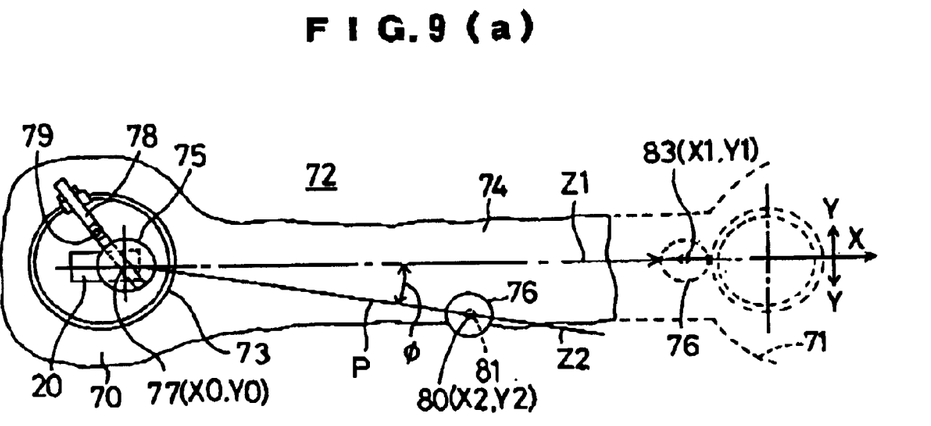
Figure 9B:
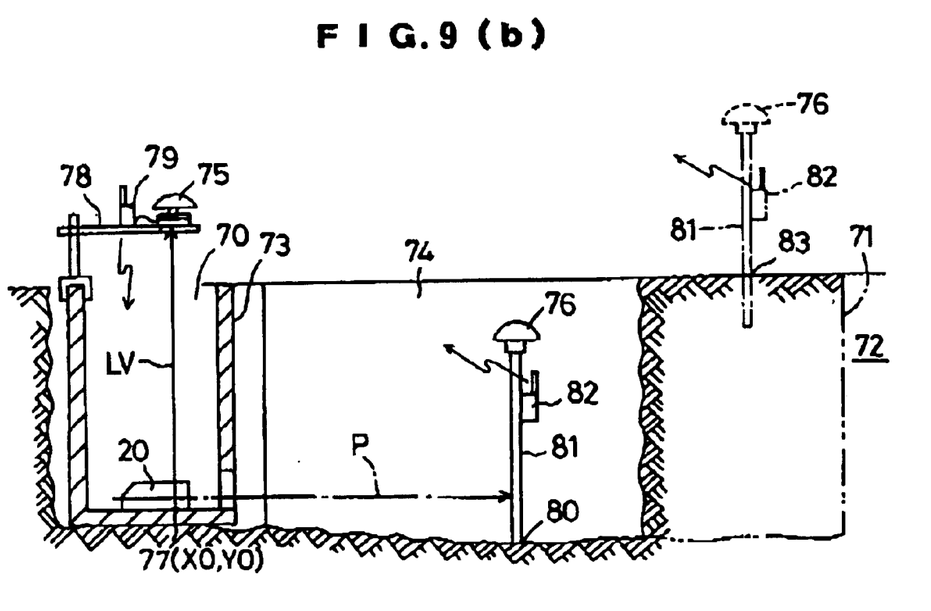

In FIGS. 9(a), (b), reference numeral 70 designates a pit dug in the ground 72, numeral 71 a proposed pit to be dug in the ground 72, and numeral 73 a manhole. The manhole 73 is shown as a model. A groove 74 dug halfway for burying the pipe is shown schematically between the pits 70 and 71. The manhole is installed in the pit 71 after being completely dug. The guide laser beam radiator 20 is installed in the pit 70 in such a manner that the center of rotation of the laser beam oscillator 40 coincides with a reference point 77 constituting the central position of the manhole 73.

The first GPS unit 75 and the second OPS unit 76 are used for setting the direction in which the guide laser beam P is radiated. The first GPS unit 75 is installed on a support table 78 vertically upward of the guide laser radiator 20.

The center of the first GPS unit 75 is located just above the laser beam Lv in such a manner that the center of rotation of the guide laser beam radiator 20 is located vertically upward of the reference point 77. The first GPS unit 75 is connected to a radio communication unit 79.

A pole 81 integrated with the second GPS unit 76 is used for conducting the work for setting the direction in which the guide laser beam is radiated. A radio communication unit 82 is integrally mounted on the pole 81. A second GPS unit 76 is connected to the radio communication unit 82.

The first GPS unit 75 detects the reference position (X0, Y0) in horizontal direction on the GPS of the guide laser beam radiator 20. The second GPS unit 76 detects an arbitrary horizontal position. The refere horizontal direction position data (X0, Y0) of the first GPS unit 75 is transmitted to the radio communication unit 79. The radio communication unit 79 transmits the reference horizontal direction position data to the radio receiver 20A (see FIG.8).

The worker sets up the pole 81 at the known point 83 as the first position. The known point 83 determined in advance by measurement according to the working drawing. The pole 81 is erected at the known point 83, and the first horizontal direction position data (X1, Y1) on the GPS is detected. The first horizontal direction position data (X1, Y1) is transmitted to the radio communication unit 82. The radio communication unit 82 transmits the first horizontal direction position data (X1, Y1) to the radio receiver 20A. The radio receiver 20A outputs the reference horizontal direction position data and the first horizontal direction position data to the arithmetic means 20B (see FIG. 8).

The arithmetic means 20B, as shown in FIG. 9, calculates the direction Z1 in which the guide laser beam P is to be radiated from the reference horizontal direction position (X0, Y0) as an origin, based on the first horizontal direction position data (X1, Y1) and the reference horizontal direction position data (X0, Y0) from the second GPS unit 76 of the pole 81 erected at the first position.

Then, the worker sets up the pole 81 at the second position 80 in such a manner that the guide laser beam P is radiated on the pole 81 in the groove 74. The second horizontal direction position (X2, Y2) pole 81 is detected using the second GPS unit 76 when the guide laser beam P is successfully radiated on the pole 81. The second GPS unit 76 transmits the second horizontal direction position data (X2, Y2) to the radio communication unit 82. The radio communication unit 82 transmits the second horizontal direction position data (X2, Y2) to the radio receiver 20A. The radio receiver 20A outputs the second horizontal direction position data (X2, Y2) to the arithmetic means 20B associated with it. The arithmetic means 20B calculates the actual direction of radiation of the guide laser beam P from the reference horizontal direction position (X0, Y0) constituting an origin based on the reference horizontal direction position data (X0, Y0) and the second horizontal direction position data (X2, Y2). The arithmetic means 20B also calculates the angle φ that the actual direction Z2 of radiation of the guide laser beam P forms to the direction Z1 in which the guide laser beam P is to be radiated.

The control unit 33 drives the horizontal angle regulation motor 35 horizontally based on the angle φ, and sets the actual radiation direction of the guide laser beam in the direction in which the guide laser beam P is to be radiated. After that, the worker sets the gradient angle θ of the guide laser beam P by operating the operation panel 56 in accordance with the working drawing.

According to the first embodiment, the pole 81 having the second GPS unit 76 for detecting the first horizontal direction position (X1, Y1) is used also for detecting the second horizontal direction position (X2, Y2) as described above. In spite of it, the second horizontal direction position (X2, Y2) can be detected using another pole having a GPS unit with equal effect.

In the first embodiment, the guide laser beam P can be set in the direction in which it is to be radiated, without using the target 23.

Also, by setting up the pole 81, the guide laser beam P can be set in the direction in which it is to be radiated, and therefore the work for setting the direction of radiation of the guide laser beam P is facilitated.

[Guide Laser Beam Direction Setting Method According to Second Embodiment]

According to a second embodiment, the target 23 is integrated with the pole 81. Also, the pole 81 includes a data collector 84, which in turn includes a display unit 84a. The pole 81 also includes a radio receiver 85. The data collector 84 is connected with the second GPS unit 76 and the radio receiver 85.

Figure 10:
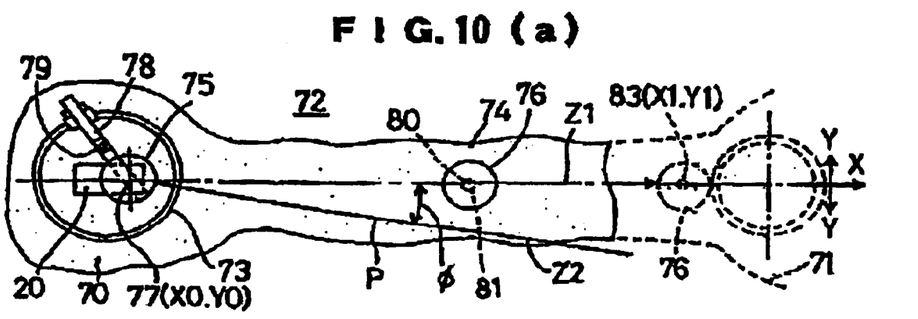
FIG. 10 is a diagram for explaining the guide laser beam direction setting work system according to a second embodiment of the invention, in which (a) is a plan view, (b) is a sectional view, and (c) is a plan view of the data collector shown in (b).

The data collector 84 is arranged on a support table 78 as shown in FIGS. 10(a), (b). The data collector 84 is connected to the first GPS unit 75 and the radio communication unit 79. The data collector 84 collects the reference horizontal direction position data (X0, Y0) of the first GPS unit 75. The reference horizontal direction position data (X0, Y0) transmitted through the radio communication unit 79 to the radio receiver 85. The data collector 84 collects the reference horizontal direction position data (X0, Y0) through the radio receiver 85.

The pole 81 is set up at the known point 83 as the first position, and the first horizontal direction position data (X1, Y1) are acquired using the second GPS unit 76. The first horizontal direction position data (X1, Y1) are input to the data collector 84. The data collector 84 includes arithmetic means for calculating the direction Z1 in which the guide laser beam P is to be radiated from the reference horizontal direction position (X0, Y0) as an origin based on the fist horizontal direction position data (X1, Y1) and the reference horizontal direction position data (X0, Y0).

The display unit 84a displays a directional line Z1' along which the guide laser beam P is to be radiated from the reference horizontal direction position (X0, Y0) as an origin as shown in FIG. 10(c). Then, the worker sets up the pole 81 up at the second position 80 in the groove 74 between the first position 83 and the reference horizontal direction position (X0, Y0).

In the process, the second position is displayed as the present point R on the display unit 83a. The position where the pole 81 is set up is changed in such a manner that the present point R is located on the directional line Z1'. Once the present point R comes to be located on the directional line Z1', the pole 81 is fixed. As a result, the second position 80 is specified, and the pole 81 is set up at the second position 80 on the directional line Z1 between and connecting the first position and the reference horizontal direction position the second GPS unit 76.

Then, the worker drives the reflected light detection circuit unit 26 by operating the operation panel 56 to scan the guide laser beam P horizontally. When the guide laser P is impinged on the target 23, the reflected laser beam P is received by the photoelectric conversion element 30, so that the guide laser beam P is located at the center of the target 23. As a result, the actual radiation direction of the guide laser beam P is set in the direction Z1 in which the guide laser beam P is to be radiated.

Figure 11:
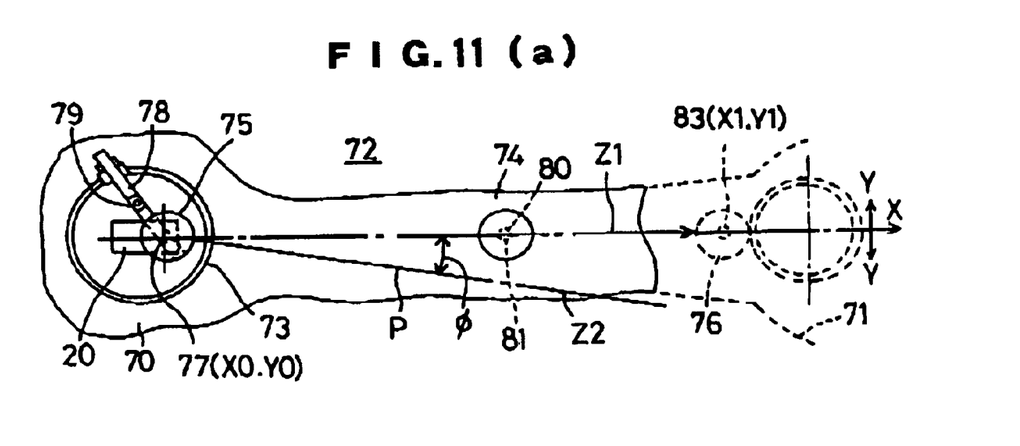
FIG. 11 is a diagram for explaining the guide laser beam direction setting work system according to a modification of the second embodiment of the invention, in which (a) is a plan view and (b) is a sectional view.

According to the second embodiment, the worker takes the trouble to attend the guide laser beam radiator 20 directly at the site for scanning the guide laser beam P. As an alternative, the reflected light detection circuit unit 26 can be driven by use of the optical remote control unit 86 shown in FIGS. 11(a), (b).

Figure 12:
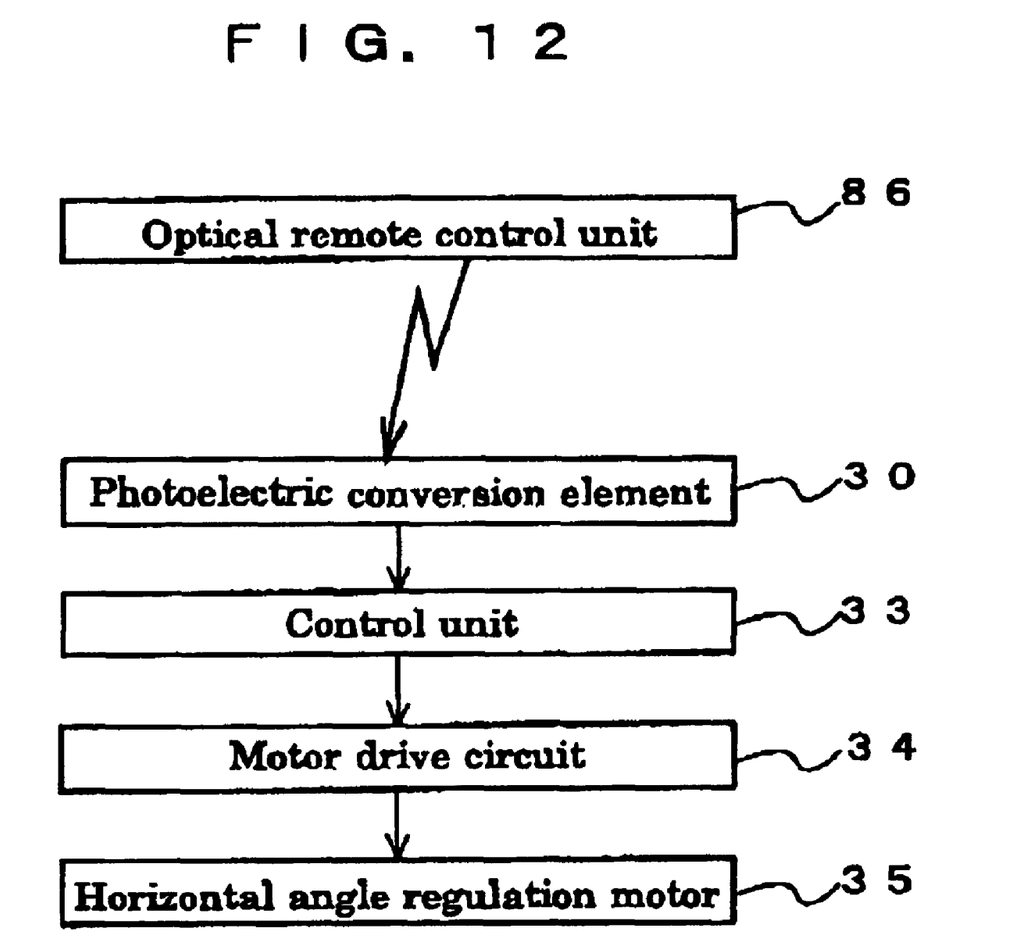
FIG. 12 is a diagram showing an example of a control circuit for the guide laser beam radiator using the optical remote control unit shown in FIG. 11.

In such a case, as shown in FIG. 12, the photoelectric conversion element 30 receives an operation command signal from the optical remote control unit 86, the modulated signal detector 31 discriminates the operation command signal, the control unit 33 controls the motor drive circuit 34 based on the operation command signal, and the horizontal regulation motor 35 is thereby driven, with the result that the guide laser beam P is scanned horizontally.

In the second embodiment, the guide laser beam radiator 20 is required to include neither the radio communication unit 20A nor the arithmetic means 20B.

It will thus be understood from the foregoing description that according to the present invention, a horizontal position can be specified using the GPS unit even by a worker not skilled in the measurement work, and therefore the work for setting the horizontal direction position of the guide laser beam can be facilitated.

What is claimed is:

1. A system for radiating a reference laser beam and utilizing GPS units for installing an article, comprising:

a reference laser beam radiator for rotatably radiating a reference laser beam;

a first GPS unit; and a second GPS unit;

said first GPS unit detecting a reference position of said reference laser beam radiator, and said second GPS unit detecting a position at which the second GPS unit is arbitrarily placed as a first position, so as to decide a direction of said reference laser beam to be radiated from the reference position of said reference laser beam radiator; and said second GPS unit detecting a position at which the second GPS unit is placed, where a direction of said reference laser beam radiator faces as a second position after being placed at and moved from said first position, wherein an angle is obtained between said second position where the direction of said reference laser beam radiator faces and said first position where the direction of said reference laser beam is to be radiated from the reference laser beam radiator, said reference laser beam radiator is directed to said first position from said second position based on the angle thus obtained;

said reference laser beam is radiated from said reference laser beam radiator, whereby a direction of an article to be installed is coincided and set along the decided direction of the reference laser beam.

2. The system according to claim 1, wherein said first and second GPS units are each connected to a radio communication unit for transmitting a data on detected position, and said reference laser beam radiator is provided with a receiver for receiving the data on detected position.

3. A system for radiating a reference laser beam and utilizing GPS units for installing an article, comprising:

a reference laser beam radiator for rotatably radiating a reference laser beam, said reference laser beam radiator being capable of setting a direction of radiation of the reference laser beam to a center of a target by receiving a light reflected from the target;

a first GPS unit; and a pole having said target and a second GPS unit;

said first GPS unit detecting a reference position of said reference laser beam radiator, and said second GPS unit, with which said pole is included, detecting a position at which the second GPS unit is arbitrarily placed as a first position, so as to decide a direction of said reference laser beam to be radiated from the reference position of said reference laser beam radiator; and said pole being placed at a position between said reference position detected by said first GPS unit and said first position which the direction of said reference laser beam is to be radiated from said reference laser beam radiator as a second position after being placed at and moved from said first position by using said second GPS unit, wherein said reference laser beam radiator is rotated to set the direction of radiation of the reference laser beam radiated from the reference laser beam radiator to the center of said target by receiving the light reflected from the target, so that said reference laser beam of said reference laser beam radiator is directed to said first position, whereby a direction of an article to be installed is coincided and set along the decided direction of the reference laser beam.

* * * * *